Aug. 9, 1966

H. L. NICHOLS 3,266,027

LOW-CURRENT ALARM FOR CATHODIC PROTECTION UNITS

Filed June 17, 1963

INVENTOR:
H.L. NICHOLS
BY: *Theodore E. Bieber*
HIS ATTORNEY

United States Patent Office 3,266,027
Patented August 9, 1966

3,266,027
LOW-CURRENT ALARM FOR CATHODIC
PROTECTION UNITS
Howard L. Nichols, Midland, Tex., assignor to Shell Oil
Company, New York, N.Y., a corporation of Delaware
Filed June 17, 1963, Ser. No. 288,371
2 Claims. (Cl. 340—248)

This invention pertains to pipe lines and more particularly to a low-current alarm for cathodic protection units employed on pipe lines.

The present practice in constructing new pipe lines is to employ thin wall pipe having a protective coating on its outer surface. The use of the thin walled pipe coupled with the inherent danger of holiday concentrated corrosion in a coated pipe having inadequate cathodic protection has increased the importance of continuous and effectual operation of the cathodic protection units on pipe lines. Normally, personnel are employed to inspect the cathodic protection units at predetermined intervals and make whatever adjustments are necessary. While this is satisfactory, it does involve considerable expense to provide sufficient personnel for a ground inspection of the cathodic protection units along the numerous pipe lines.

At present most pipe lines employ air patrols to survey the pipe lines to detect leaks and other malfunctions. Thus, it would be desirable to provide an apparatus for the pipe line that would monitor the operation of the cathodic protection circuits and signal to the air patrol the proper operation of the cathodic protection circuits.

Accordingly, it is the principal object of this invention to provide an apparatus for monitoring the cathodic protection circuits used on pipe lines and operate a signalling device that is observable from the air when the cathodic protection circuits malfunction.

A further object of this invention is to provide an apparatus for monitoring the cathodic protection circuits utilizing simple reliable components capable of operating for long periods of time with a minimum of maintenance.

A further object of this invention is to provide an apparatus for monitoring the cathodic protection circuits used on pipe line which apparatus will fail safe in the event of low cathodic protection current, loss of power to the cathodic protection circuits or inoperative warning devices.

The amount of acthodic protection afforded a pipe line at any one moment bears a definite relationship with the amount of current being drained by the line from the cathodic protection units. Thus, after a system has been cathodically balanced the amount of current being drained will be indicative of the protection level of the pipe line. This invention provides a simple and reliable apparatus for monitoring the current output of a cathodic protection unit. The system utilizes a galvanometer type meter having a set of contacts for monitoring the current output of the cathodic protection unit. The contacts on the galvanometer meter are used to short circuit a normally energized load relay thus opening the load relay. The load relay in turn normally supplies power to a signalling device. When the load relay opens the power will be removed from the signalling device and the signalling device will move to a position that signals the inoperativeness of the cathodic protection unit.

A periodic sampling of the cathodic protection current is insured by an interrupting relay coupled in the power supply of the apparatus in order to periodically interrupt the power supply. By interrupting the power supply the galvanometer type meter will sample the current and when the current is of a sufficient value will remain open and permit the load relay to be re-energized.

In case of a complete power failure the power will be removed from the signalling device thus indicating malfunction of the unit. Similarly when the power returns the interrupting relay will permit the periodic sampling of the cathodic protection circuit to return the system to normal. The signalling device may be of one of numerous types, for example, it may be an obstruction lamp that is easily seen from the air or a semaphore type device in which the semaphore arm would drop to indicate a fault.

The above objects and advantages of this invention will be more easily understood from the following detailed description of a preferred embodiment when taken in conjunction with the attached drawing in which.

Figure 1:
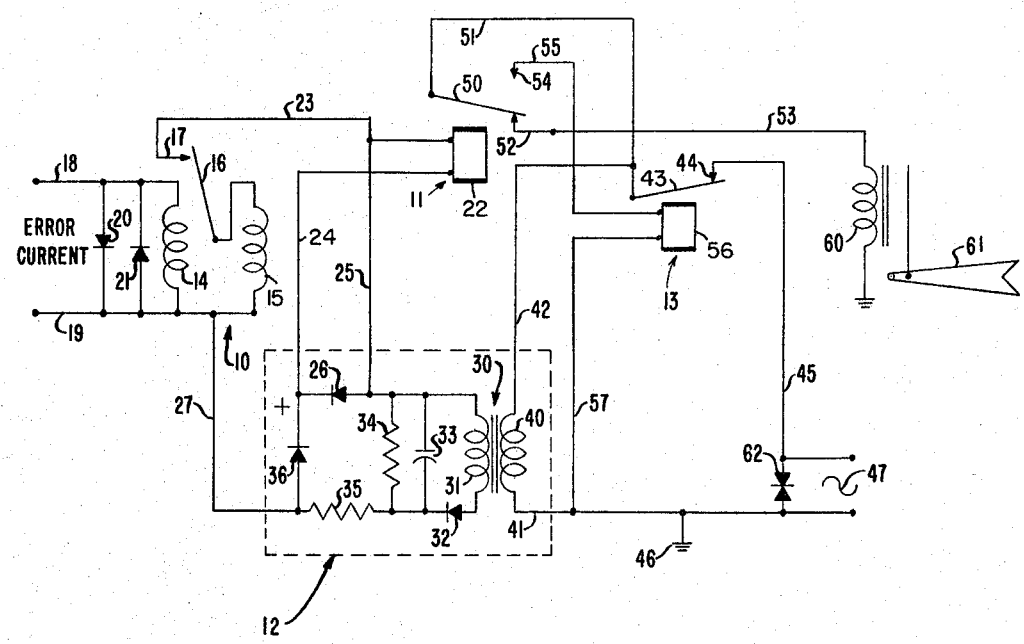
FIGURE 1 is a schematic circuit diagram of a preferred embodiment.

Referring now to FIGURE 1, there is shown a galvanometer type of meter-relay 10 having controller contacts which are coupled to a load relay 11. The load relay 11 and the meter-relay are supplied with power from a power supply 12 that is coupled to a source of external power. An interrupting relay 13 is provided for periodically interrupting the external power supplied to the power supply 12 when the contacts of the meter relay close. The load relay 11 is connected to supply power to a signalling device that is shown as a solenoid operated semaphore 61.

The meter relay 10 is provided with a sensitive coil 14 that measures or monitors the current in a cathodic protection unit. The cathodic protection unit (not shown in the attached drawing) is connected to the leads 18 and 19 of the sensitive coil 14. Two diodes 20 and 21 are connected in opposition to form a shunt arrangement for the sensitive coil 14, the shunt bypasses excessive currents that would damage the coil. Excessive currents could arise from power fluctuation in the power supply of the cathodic protection unit or from lightning or other electrical disturbances contacting the cathodic protection unit. The meter relay includes a movable member or needle 16 which forms one contact and cooperates with the stationary contact 17. Thus, when the current falls below a predetermined value the movable contact 16 will close on the stationary contact 17 indicating that the current has fallen below the preset value. To insure a long contact life a locking coil 15 is provided in the meter relay in series with the contacts. The locking coil 15 is disposed to increase the torque tending to move the movable member 16 into contact with the stationary contact 17.

The stationary contact 17 is coupled by means of a lead 23 to the operating coil 22 of the load relay 11. The load relay coil 22 is also coupled to the power supply 12 by means of leads 24 and 25. A bypass diode 26 is disposed in a shunt arrangement across the relay coil 22 to bypass the back E.M.F. that is generated when the coil 22 is short-circuited to prevent damage to the remaining components in the power supply 12.

The power supply 12 utilizes a transformer 30 whose secondary 31 is coupled to a rectifying diode 32. The diode 32 forms a half-wave rectifier and a filtering circuit formed by the capacitor 33 resistance 34 is provided in parallel arrangement with the secondary 31. A load limiting resistor 35 is coupled in series with the positive side of the power supply with the positive side of the power supply being coupled by means of a lead 27 to the negative side of the holding coil 15 of the galvanometer meter. A pair of opposed diodes 62 is provided as a circuit protecting device, the diodes 62 preferably being selenium rectifying diodes. The positive side of the power supply 12 is also coupled through a diode 36 to the lead 24 that supplies power to the coil 22 of the load relay 11.

From the above description it can be seen that the load relay 11 is normally energized from the power supply 12. When the contacts of the meter relay 10 close indicating that the current in the cathodic protection unit has fallen below the preset value the coil of the load relay coil 22 will be short-circuited through the meter relay locking coil and contacts, causing insufficient holding current to be delivered to relay coil 22. Thus, the load relay 11 will be de-energized permitting the contacts to open. The values of coil 22 and locking coil 15 in meter relay 10 are specifically selected to permit optimum interoperation.

The primary winding 40 of the transformer 30 has one side connected by means of a lead 41 to a ground 46 while the other side of the primary 40 is coupled by means of a lead 42 to the movable contact 43 of the interrupting relay 13. The fixed contact 44 of the interrupting relay 13 is coupled by means of a lead 45 to a source of power 47. The source of power 47 would normally be commercially available 120 volt 60 cycle A.C. having one side grounded at 46. The stationary contact 43 of the interrupting relay 13 is also coupled by means of a lead 51 to the movable contact 50 of the load relay 11. The load relay 11 is provided with two stationary contacts 52 and 54. The stationary contact 52 is coupled by means of a lead 53 to the solenoid 60 that operates the semaphore arm 61. The semaphore arm 61 is designed to be moved to a horizontal position when the solenoid coil 60 is energized and to drop to a vertical position when the solenoid 60 is de-energized. The stationary contact 54 forms the normally closed contact when the load relay 11 is de-energized and is coupled by a lead 55 to one side of the operating coil 56 of the interrupting relay 13. The other side of the coil 56 is coupled to the ground 46 by means of a lead 57.

The operation of the above monitoring circuit can be best understood by noting that the contacts of the meter relay 10, the load relay 11 and the interrupting relay 13 are shown in their normal operating position. As seen, the load relay 11 is normally energized thus pulling the movable contact 50 into contact with the fixed contact 52. The interrupting relay 13 is normally de-energized thus the movable contact 43 is moved to the upper position where it contacts the fixed contact 44. With the load relay 11 and interrupting relay 13 in these positions power will be supplied to the solenoid 60 of the signalling device. Power will also be supplied by means of the lead 42 to the power supply 12. The power supply 12 in turn will energize the coil of the load relay 11. When the current in a cathodic protection unit falls below a preset value the contacts of the meter relay will close. When the meter relay contacts close power will be supplied to the holding coil 15 insuring that they remain closed. When the contacts of the meter relay close they will short circuit the coil 22 of the load relay 11. When the coil 22 is short circuited the load relay 11 will in effect be de-energized permitting the movable contact 50 to move upwardly into contact with a stationary contact 54. This will effectively remove the power from the solenoid 60 of the indicating device. The semaphore arm 61 will then drop to the vertical position indicating a fault in the cathodic protection circuits. In addition, when the movable contact 50 contacts the stationary contact 54 the coil 56 of the interrupting relay 13 will be energized. When the coil 56 is energized it will pull the movable contact 43 downward thus breaking the contact with the stationary contact 44. When the contacts 43-44 open they will effectively interrupt the power to the power supply 12. When the power is removed from power supply 12 the holding coil 15 of the galvanometer meter 10 will be de-energized thus permitting the movable member 16 to move to its normal position. If the cathodic protection current has again risen to a sufficient value the contacts of the meter relay will open and will remain open when interrupting relay 13 is again de-energized. The interrupting relay is de-energized when the contacts 43 and 44 open since the power is removed from the coil 56. To insure efficient operation of the monitoring circuit the interrupting relay 13 is preferably a time delay relay. The time delay between the opening of the contacts 43-44 and their closing upon removal of power from the coil 56 should be longer than the time constants of the power supply 12, the coils of the meter relay 10 and the load relay 11. If the time delay of the interrupting relay 13 is longer than this time constant it will insure that the holding coil 15 is completely de-energized prior to the re-application of power to the power supply 12. Thus the meter relay contacts can open if the cathodic protection current has risen to a sufficient value.

Figure 2:
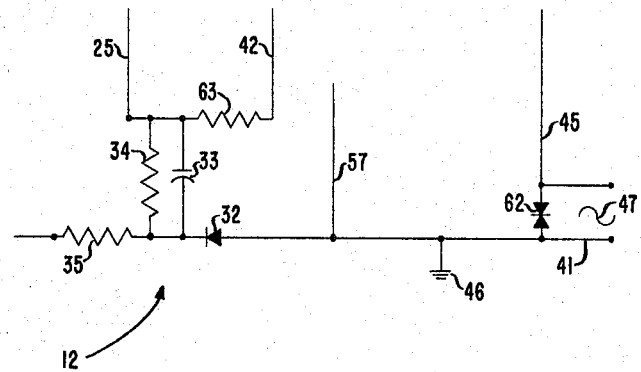
FIGURE 2 is a schematic circuit diagram of an alternate power supply for the circuit shown in FIGURE 1.

An alternate power supply is shown in FIGURE 2 wherein the leads to the power supply are designated with the same numerals as used in FIGURE 1. The alternate power supply uses a second load limiting resistor 63 in place of the transformer 40 of power supply shown in FIGURE 1. The resistance 63 is chosen to limit the voltage in the remainder of the circuit to an acceptable value.

While one preferred embodiment of this invention has been described in detail, many modifications and changes are possible, for example, instead of employing a semaphore type device for indicating when a fault has occurred in the cathodic protection, one could use an obstruction lamp or similar device that would be illuminated when the operation of the cathodic protection circuit is normal. Likewise, the meter relay 10 could be adjusted to sense low voltage or high current or any other electrical characteristic of the circuit being monitored. The important features of this invention are the use of relays for performing all of the functions in combination with semiconductor diodes. Thus, the unit is relatively simple to build and maintain and will provide reliable operation for extended periods. In addition, the relays are relatively low in cost thus reducing the low overall cost for a complete monitoring circuit. Accordingly, this invention should not be limited to the particular details described in the preferred embodiment but only to its broad scope.

I claim as my invention:

1. An apparatus for monitoring an electrical circuit comprising:
   (a) a galvanometer type meter relay having a set of contacts, a sensitive coil and a locking coil connected in circuit with said contacts, said locking coil being operable to add a contact-closing force to that of the sensitive coil;
   (b) circuit means coupled to said sensitive coil for supplying a current representative of the electrical current being monitored by said apparatus;
   (c) a load relay having a coil and contacts, a power supply coupled to the coil of said load relay to normally energize said load relay, the coil of said load relay in addition being coupled to one of the contacts of said meter relay;
   (d) said power supply in addition being coupled to the other of the contacts of said meter relay, the contacts of said meter relay being disposed to short-circuit the coil of said load relay through the locking coil when the contacts of said meter relay close;
   (e) an interrupting relay having a coil and contacts, a source of power, one side of said source of power being coupled to the contacts of said interrupting relay, the other side of said source of power being coupled to ground, the contacts of said interrupting relay in addition being coupled to the normally closed contacts of said load relay, one side of the coil of said interrupting relay being coupled to the normally open contacts of said load relay, the other side of the coil of said interrupting relay being coupled to ground; and (f) an indicating device coupled to the normally closed contacts of said load relay and to ground whereby said load relay will supply power to said indicating device when said load relay is energized and interrupt said supply of power when said load relay is shorted.

2. The apparatus of claim 1 in which the interrupting relay has a longer delay period than the time constants of the power supply and meter relay.

References Cited by the Examiner

UNITED STATES PATENTS

| | | | |
|---|---|---|---|
| 2,265,920 | 12/1941 | Maize | 324—29 X |
| 2,895,082 | 7/1959 | Suyetani | 317—141 X |
| 2,947,918 | 8/1960 | Hamilton | 317—141 X |
| 3,200,302 | 8/1965 | Krebs et al. | 317—141 |

NEIL C. READ, *Primary Examiner.*

D. K. MYER, *Assistant Examiner.*